United States Patent [19]

Elliott, Jr.

[11] 4,311,299
[45] Jan. 19, 1982

[54] CABLE LASHER

[76] Inventor: Alton D. Elliott, Jr., P. O. Box 147, Guntersville, Ala. 35976

[21] Appl. No.: 230,627

[22] Filed: Feb. 2, 1981

[51] Int. Cl.³ .............................................. E21C 29/16
[52] U.S. Cl. .......................................... 254/134.3 CL
[58] Field of Search ................. 254/134.3 CL, 134.3 R

[56] References Cited

U.S. PATENT DOCUMENTS

| 3,174,725 | 3/1965 | Pfundt | 254/134.3 CL |
| 3,259,370 | 7/1966 | Neale | 254/134.3 CL |
| 3,648,976 | 3/1972 | Neale | 254/134.3 CL |

Primary Examiner—Robert C. Watson

Attorney, Agent, or Firm—C. A. Phillips

[57] ABSTRACT

A cable lasher for lashing coaxial communications cable to an overhead support cable, typically extending between utility poles. A coaxial cable is fed in through one end of a lasher, and lashing occurs as the cable exits the lasher. The coaxial cable is separately confined within a tubular passage via a removable housing which is positioned within an elongated cavity of the lasher. A flexible tubular member provides a cable entrance to the tubular passage, and it is adapted to bend no more than a minimum angular arc under the weight of the coaxial cable, thus preventing the cable from bending beyond its elastic limits.

5 Claims, 17 Drawing Figures

CABLE LASHER

TECHNICAL FIELD

This invention relates to devices for the installation of overhead communications cable, and particularly to a coaxial cable having an outer metal cover.

BACKGROUND ART

Cable television has typically been provided to customers through coaxial cable, and much of it is strung overhead between utility poles. Inasmuch as the coaxial cable is not self-supporting, it must be supported by a support cable, and the two are typically lashed together by a spiral of wire. In many instances, there may be two or more coaxial cables supported in this manner by a single support cable.

For many years, and up until about 20 years ago, the coaxial cable employed was of a type having stranded inner and outer conductors, the outer conductor being in the form of a braid of wire. A flexible, plastic annular tube separated the conductors and provided the necessary insulation. There was also a plastic cover which surrounded the braided outer conductor and served to keep out moisture. This cable, which is still manufactured, is relatively cheap and was used extensively by the cable TV industry. However, it was found that it was not very durable, and after a period of weeks to a few years, the outer insulating cover would often crack, moisture would enter the conductors, and the insulating separator would deteriorate. This, in turn, resulted in a poor electrical performance of the cable and greatly impaired the quality of the signals transmitted on the cable.

As a result of the difficulties being experienced with coaxial cable, an improved type was developed, one wherein the outer conductor is formed of a solid aluminum tube. While this type structure provides an excellent protection insofar as moisture getting into and between the conductors is concerned, it is fairly rigid and therefore difficult to string overhead without bending it to a degree which causes it to break or deform, either of which requires a cable to be cut, the damaged portion removed, and the cables spliced back together.

As indicated above, communications cables in general are strung by lashing them to a support cable, typically between utility poles. Lashing is effected by means of a lashing machine which rides as a trolley on the support cable. Lashing machines used today are of the type which were basically developed for stringing telephone cables, and insofar as is known, none have been developed particularly for the new type, an aluminum covered coaxial cable. With a conventional lashing machine, a cable to be lashed is initially fed up from the ground through an open cavity in the underside of the lashing machine. The cavity is then closed as the lasher is pulled along the support cable. A coaxial cable is fed upward and through the end of the lasher, and a strand of lashing wire lashes the coaxial cable through the support cable at the trailing end of the lasher.

There are problems that must be dealt with. First, an extraordinary effort must be made to prevent sharp angle bends where the coaxial cable enters the lasher. Second, the cavity through which the cable is strung is typically much larger than the cross section of the cable being strung, and coaxial cable may come in contact with internal walls of the lasher and the trolley cable at various angles of engagement, which may deform or even cut the coaxial cable.

Thus, there remains a substantial problem in the installation of the new type coaxial cable, and it is the object of this invention to provide a solution to the above mentioned problems.

DISCLOSURE OF THE INVENTION

In accordance with this invention, a cable lashing system includes a trolley mounted lashing machine having a longitudinal cavity, but locked into this cavity is a removable cable protection unit. This unit prevents a coaxial cable from being injured by moving components of the lashing machine and is of a configuration to snugly fit within the lock tube cavity. It includes an inner tubular passageway from end to end. At one end of the passageway, and located at the entrance end of the lashing machines, is a bendable tube which extends outward for a distance of at least 20 inches, and it is formed of a bendable material which has an increased resistance to bending as it approaches an arc which would have a radius of less than 12 times the cable outer diameter. Typically, this quality is provided by a relatively rigid wall PVC pipe, a portion of the pipe extending into and through the housing portion of the unit which supports the tubing.

DETAILED DESCRIPTION OF THE DRAWINGS

Figure 1:
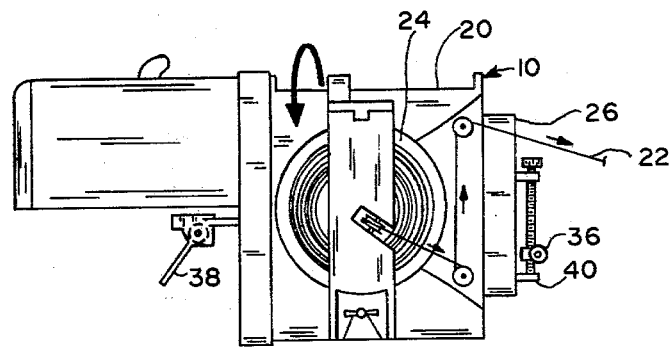
FIG. 1 is a side view of a General Machine Products Company type C cable lasher.
Figure 3:
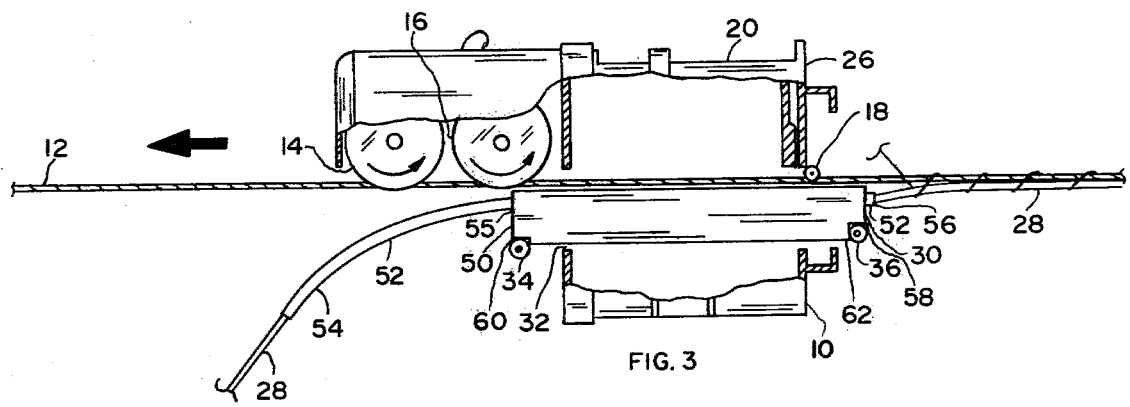
FIG. 3 is a side view, partly in section, showing the combined structure of a lasher and cable protection unit.

Referring now to FIGS. 1 and 3, lasher or lashing machine 10 is representative of one of the several lashing machines presently being marketed, it being of the type C cable lasher manufactured by General Machine Products Company, Inc. The machine rides in a trolley fashion on support cable 12 by means of rollers 14, 16, and 18. It includes a drum 20 which rotates about an axis parallel to support cable 12, it being driven by rollers 14 and 16 (by means not shown) as lasher 10 is pulled along cable 12. As this occurs, a wire 22 fed from a spool 24 on drum 20, and from the trailing end 26 of lasher 10, is spiral wound around support cable 12 and coaxial cable 28 to thereby lash the coaxial cable to the support cable (FIG. 3).

Figure 6:
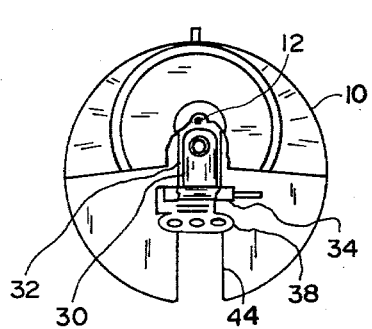
FIG. 6 is a front end view of the lasher and cable protection unit.
Figure 7:
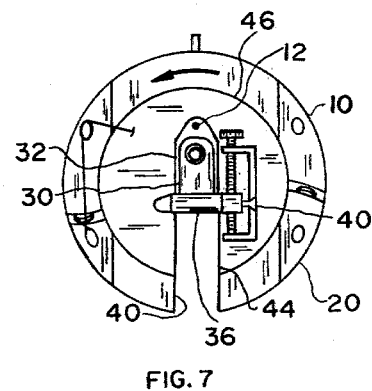
FIG. 7 is a rear end view of the lasher and cable protection unit.
Figure 2:
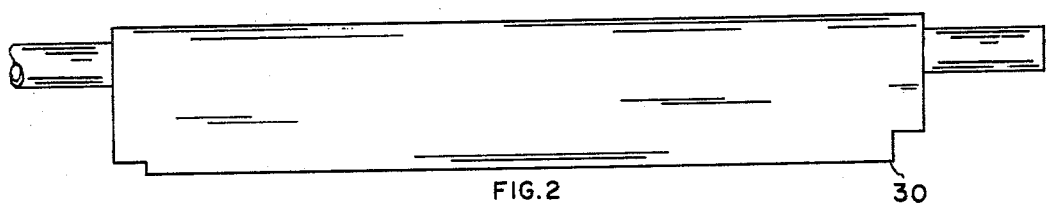
FIG. 2 is a side view, partially broken away, showing the central body portion of a cable protection unit as contemplated by this invention.
Figure 5:
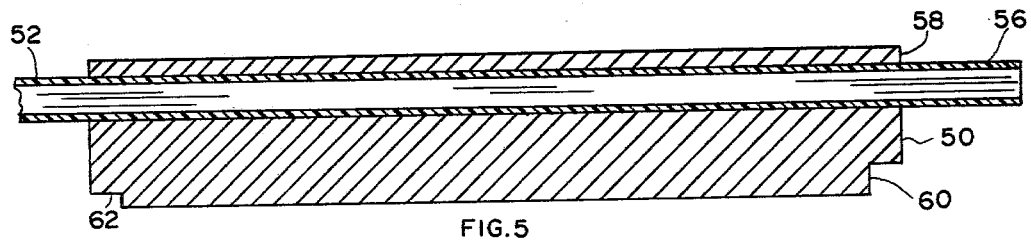
FIG. 5 is a sectional view taken along line 5—5 of FIG. 4.
Figure 4:
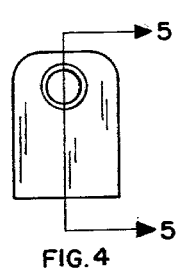
FIG. 4 is an end view of the cable protection unit shown in FIG. 2.

In accordance with the present invention, a cable protection unit is constructed as shown in FIGS. 2 and 4-13, and one such unit, cable protector 30, is shown installed on lasher 10 in FIGS. 3, 6, and 7. It is positioned within cavity 32 of lasher 10 and locked into position by rollers 34 and 36. Roller 34 is lockable in a position as shown in FIGS. 3 and 6 by support 38, and roller 36 is lockable in position by support 40, it being shown in FIGS. 3 and 7. Supports 38 and 40 are standard portions of the Model C lasher referred to above and are not shown in detail. Their function insofar as the present invention is concerned is to simply employ rollers 34 and 36 in the position shown when protection unit 30 is in place. The support members do provide means for rotating the rollers 90° so that access to cavity 32 is available through slot 42. It will be noted, however, that FIG. 14, illustrating a modification of the invention, includes a roller and support which is like the counterpart shown in FIG. 1, and that FIGS. 15 and 16, relating to this modification, illustrate a roller and roller support mechanism which will perform the function of the combination of roller 34 and support 38 (as shown if FIG. 6).

Referring back to the embodiment of the invention shown in FIGS. 3, 6, and 7, cable protection unit 30 is initially installed into cavity 32 through slot 42 in drum 20, and slot 44 in the fixed body of lasher 10, with the two slots being coincident as shown in FIGS. 6 and 7. Rollers 34 and 36 and support members 38 and 40 would be in an open position (not shown) wherein the rollers are rotated horizontally 90° from the position shown in FIGS. 6 and 7.

Referring particularly to FIGS. 2-5, cable protection unit 30 comprises semi-rigid housing member 50, typically of moldable plastic, which is formed around tube member 52. Tube member 52 is made of a bendable tubing, such as thin wall PVC tubing. End region 54 of tubing member 52 is adapted to extend from the front or forward end of housing member 50 and extends a distance of from 10 to 30 inches. After or rear end region 56 of tubing member 52 typically extends a short distance, from 0 to 2 inches, or not at all, from rear end 58 of housing member 50. Notches 60 and 62 in housing member 50 are supported on rollers 34 and 36.

Figure 8:
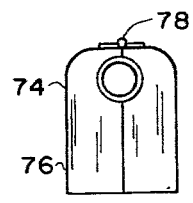
FIGS. 8 and 9 are end views showing closed and open positions of a modified cable protection unit.
Figure 9:
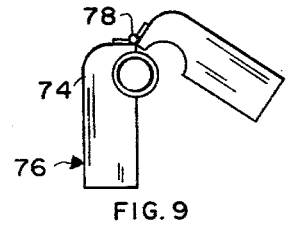
Figure 10:
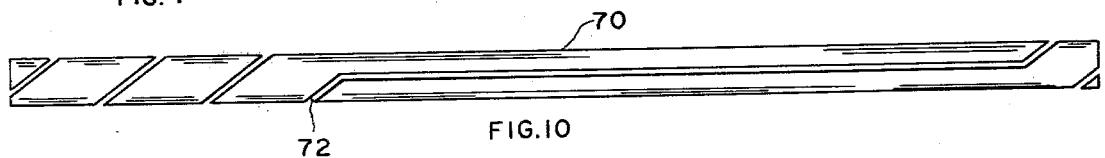
FIG. 10 is a side view of a tubing member employed with the embodiment of the invention shown in FIGS. 8 and 9.

FIGS. 8-10 illustrate a cable protection unit particularly adapted to be placed around a cable already partially in place. Thus, bendable tube 70 has a slit 72 which enables it to be slipped over and enclose the cable. Thereafter, split body 74 of protection unit 76 is opened as shown in FIG. 9, being hinged by hinge 78, and bendable tube 70 is inserted. Thereafter, protection unit 76 is closed as shown in FIG. 8, and then would be installed in a lasher, being held in place as shown in FIGS. 3, 6, and 7.

Figure 11:
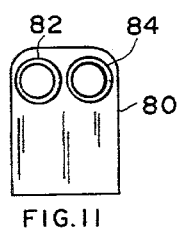
FIGS. 11-13 illustrate further embodiments of cable protection units.
Figure 12:
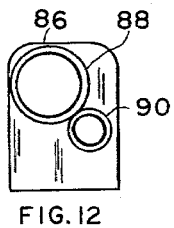
Figure 13:
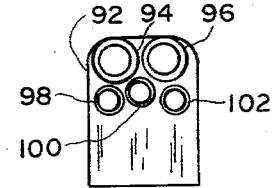
Figure 14:
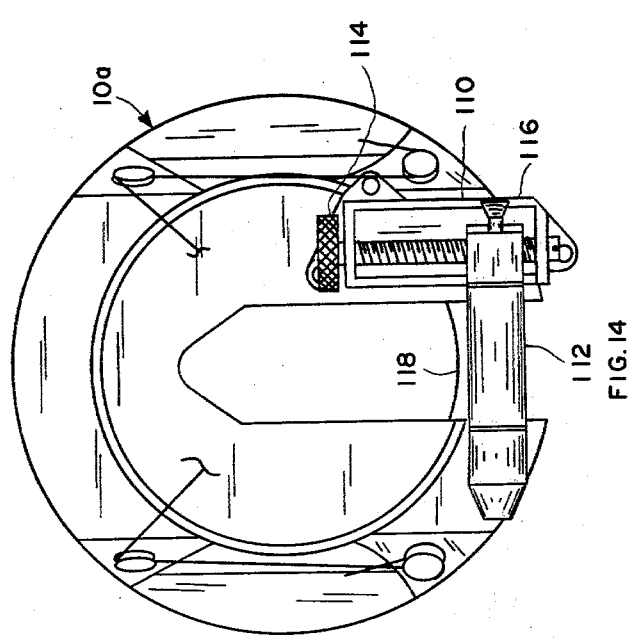
FIG. 14 is a rear end view of a modification of the lashing machine as shown in FIG. 7 wherein the rear roller support is moved down to accommodate a larger, in height, cable protection unit.

FIGS. 11-13 illustrate multiple bendable tubes installed in a housing. Thus, housing 80 of FIG. 11 contains two equal sized but separated tubes 82 and 84. Housing 86 of FIG. 12 contains two different sized tubes 88 and 90. FIG. 13 illustrates a housing 92 having two large tubes 94 and 96 and three small tubes 98, 100, and 102. In each instance, a tube would have a leading end region as shown in FIG. 3 wherein there would be effected a transitional bend of sufficiently large radius to prevent damage to the cable.

Figure 17:
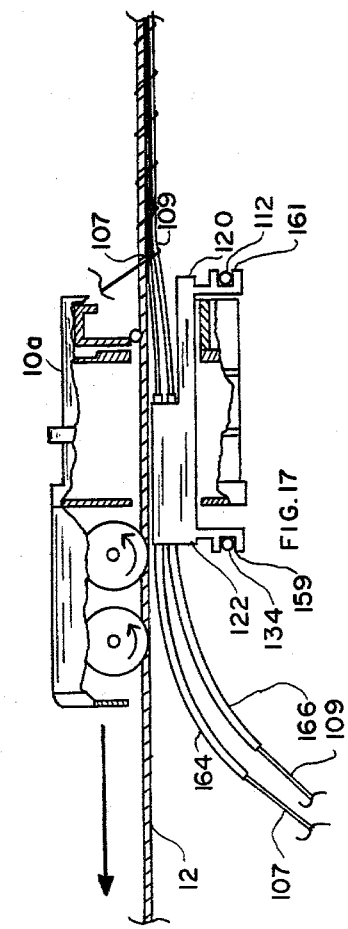
FIG. 17 is a side view, partially broken away, showing a modified form of lashing machine, and illustrating, in position, a modified cable protection unit.

FIGS. 14-17 illustrate a modification of the invention wherein the conventional lasher or lashing machine shown in FIGS. 1, 3, 6, and 7 is modified as lasher 10a to accommodate a larger, in height, cable protection unit 120. It is further modified by cutting away a portion of its trailing end, thus enabling cables 107 and 109 to more gradually move up to a support cable 12 before being lashed, providing still further protection of the cable against bends. Latch assembly 110 is a repositioned latch assembly from that of latch 40 of FIG. 7, latch assembly 110 being moved to a lower position. Roller 112 of latch assembly 110 is pivoted and threadably mounted on screw 114, in turn mounted on frame 116. Thus, it is to be noted that roller 112 is mounted just below the clearance surface 118 of modified lasher 10a, enabling, as shown in FIG. 17, the modified cable protection unit 120, which extends between the top and bottom of the interior cavity of lasher 10a. This enables more room for the body of cable protection unit 120, and thus permitting it to be larger and to accommodate a greater volume of cables.

Figure 16:
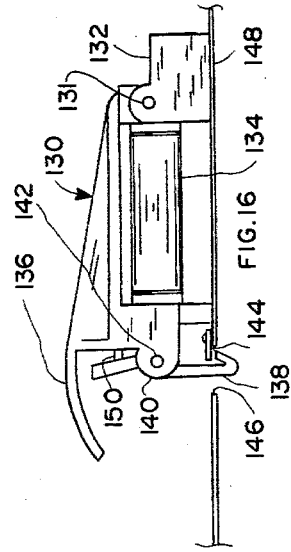
FIG. 16 is a top plan view of the latch mechanism illustrated in FIG. 15 and more completely shown.
Figure 15:
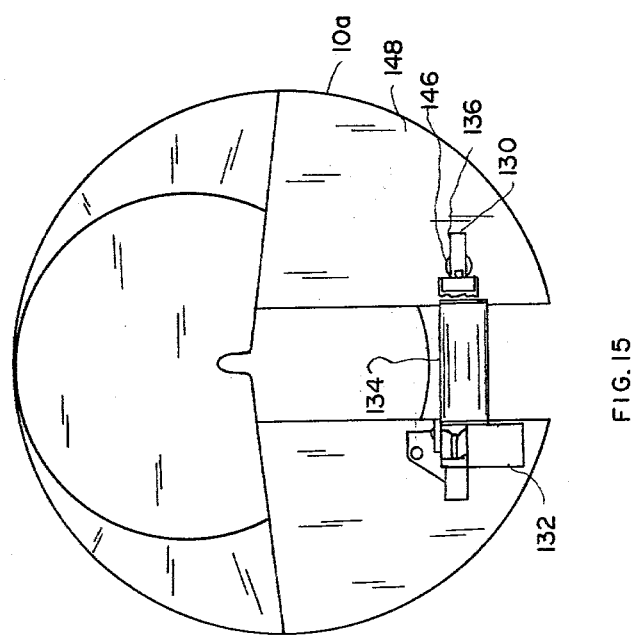
FIG. 15 is a front end view of the lasher shown in FIG. 14 illustrating, in contrast to FIG. 6, a lowered position for the front roller which supports the cable protection unit. A portion of a latch mechanism is broken away.

FIGS. 15 and 16 illustrate a front lasher roller assembly 110 which is located at a lower position coordinate with the elevation of a rear latch-roller assembly 116. Roller-latch assembly 130 is pivotally supported by pin 131 on a block 132, in turn mounted on lasher 10a, and it in turn typically supports a roller 134 and latching arm 136. Roller 134 is movably mounted about an axle through its center (not shown). Latch arm 136 supports the left end (FIG. 16) of the axle of the roller and latching block 140. The latter, in turn, pivotally supports catch 138 about a pin 142. Catch 138 is held in the position shown, wherein it engages a latching plate 144 on end plate 148 of lasher 10a. By pressing catch 138 at its upper end and depressing a spring supported pin 150 (not shown), catch 138 would be moved clockwise, enabling it to be free of latching plate 146, and thus enabling roller 134 to be moved back out of the way to insert cable protection unit 120.

Referring to FIG. 17, the modified form of protection unit 120 is shown installed, with front roller 134 and rear roller 112 supporting it in receptacles 159 and 161. Two cable receptacles, 164 and 166, extend through housing 122, illustrative of its adaptation for the handling of multiple cables. Of course, the number of cables which may be handled may vary, depending upon the size cable.

As stated above, the cable protection unit of this invention has two basic functions. One is to protect the cable as it passes through the mechanism of the lasher, which includes rollers 14, 16, and 18 (FIG. 3) and rotating drum 20. The other is to insure that the cable is not subjected to unsupported bending. By these features of the invention, there is provided a total lashing assembly which enables rapid and injury-free installation and lashing of cable.

I claim:

1. A system comprising:
   a cable lasher supportable for movement along a support cable, and said lasher including;
   an elongated cavity extending from end to end of said lasher, and through which the support cable is positionable, and
   an openable gate member at each end of said lasher, a said openable gate member normally, when closed, extending across an end of said lasher, and when opened, being positioned in a direction which does not extend across said opening, whereby vertical access upward to the lasher and said cavity is unimpeded;
   a housing supportable in said cavity by said openable gate members when closed;
   said housing including at least one tubular passageway generally parallel to said support cable through said cavity; and
   a bendable tubular member forming an extension of said passageway at one end, the forward end, of said lasher.

2. A lashing system as set forth in claim 1 wherein;
   said housing is openable to expose a said tubular passageway; and
   said bendable member is positionable within said passageway, and includes a slot which extends end to end, which includes a spiralled configuration in at least a portion of the region which is exterior to said housing;
   whereby a cable may be moved through said slot into the tubing, then placed in said opening in an open housing, the housing then closed, and then the housing with said cable placed in said cavity.

3. A lashing system as set forth in claim 1 wherein said lashing machine includes a rotable member extending around said cavity, and said rotating member periodically closing the bottom of said cavity, and said openable gate members are positioned at an elevation wherein the tops of the gate members do not extend appreciably higher than the floor created by said rotating member closing said cavity.

4. A lashing system as set forth in claim 3 wherein there are a plurality of combinations of a tubular passageway and bendable tubular member.

5. A lashing system as set forth in claim 4 wherein one said combination is of a different diameter than another.

* * * * *